(12) United States Patent
Gousman et al.

(10) Patent No.: US 7,093,542 B2
(45) Date of Patent: Aug. 22, 2006

(54) WARHEAD WITH INTEGRAL, DIRECT-MANUFACTURED FEATURES

(75) Inventors: Kenneth G. Gousman, Palmdale, CA (US); Scott D. Van Weelden, Lancaster, CA (US); Brian T. Rosenberger, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 75 days.

(21) Appl. No.: 10/831,052

(22) Filed: Apr. 22, 2004

(65) Prior Publication Data

US 2005/0235862 A1   Oct. 27, 2005

(51) Int. Cl.
*F42B 12/22* (2006.01)
(52) U.S. Cl. .......................................... 102/493; 86/83
(58) Field of Classification Search ................ 102/493; 219/121.69; 86/53
See application file for complete search history.

(56) References Cited

U.S. PATENT DOCUMENTS 4,323,756 A    4/1982  Brown et al.
5,095,821 A *  3/1992  Merz .......................... 102/493
2001/0004868 A1* 6/2001 Burckhardt et al. ........ 102/493

* cited by examiner

*Primary Examiner*—Troy Chambers (57) ABSTRACT

Warhead structures and features are fabricated using direct manufacturing technologies, a method for fabricating bulk warhead structures by sequential and additive deposition of melted feedstock layers. Suitable energy sources for melting the feedstock can be various high energy density technologies including laser, electron beam, plasma arc deposition, and the like. The high energy density in combination with high cooling rates results in structures with homogeneous microstructures. The feedstock can be in the form of wire or powder and is applied to a substrate by introduction to a molten pool on the substrate, accumulating to additively combine with the substrate. The approach provides for warhead structures with singular and combined unique features to include: integral constructions, tailored fragmentation patterns, use of dissimilar materials for special effects, and variable material property constructions for enhanced performance.

23 Claims, 14 Drawing Sheets

WARHEAD WITH INTEGRAL, DIRECT-MANUFACTURED FEATURES

BACKGROUND OF THE INVENTION

Warheads and warhead structures are used in many various conditions and circumstances including air to air ordnance, ground to air ordnance, air to ground ordnance, ground to ground ordnance, and structural demolition charges. Design of an effective warhead or other penetrating projectile involves analysis of several considerations including penetration, blast, and fragmentation performance. Pertinent design parameters include shape, size, mass, material composition, enhanced or combined effect features (combinations of fragmentation, incendiary, and explosive effects), and others.

Warhead shape, size, and material composition are selected according to functional considerations. Some warheads have an aerodynamic shape that facilitates delivery through the air while others are shaped to assist penetration or to affect a particular explosive signature upon impact/detonation. Some warheads are shaped and integrated into higher order assemblies such as missile systems. Warhead size and mass are examples of design parameters that support and enable the ultimate performance of the warhead.

Various existing techniques are used to attain enhanced/combined effects. For example, several techniques have been used to attain enhanced fragmentation capabilities. These include prefabricated fragments molded into a shell constructed from metal or other suitable materials, and machining (scribing) of a fragmentation pattern into a continuous wall surface of a shell body. Combined effects have been achieved through the incorporation of warhead sub-assemblies using specialized reactive or dissimilar materials that are "attached" to the basic warhead.

Conventional warhead manufacturing methods typically use casting or forging technologies to construct core components. Warhead material selections and designs are generally restricted to those capable of casting or forging, limiting allowable shapes, sizes, material compositions, capabilities, and effects. Multiple part subassembly constructions (particularly for combined effects features) are typically used. These increase touch labor, parts count, and design/development/production costs while reducing design options.

Conventional warhead manufacturing methods involve design and fabrication of molds and other overhead that hinder development of new warhead design concepts. This tooling requirement lengthens both design and fabrication cycles, necessitates significant upfront and specialized infrastructure expenses, and fails to efficiently support rapid prototyping activities.

SUMMARY OF THE INVENTION

Warheads and warhead structures (warhead structures include bombs, munitions, cluster bomblets, bullets, nosecaps, missiles, and other projectiles) are fabricated using direct manufacturing technologies, a method for fabricating bulk warhead structures by sequential and additive deposition of thin melted feedstock layers. The feedstock can be in the form of wire or powder and is applied to a substrate by introduction to a molten pool on the substrate caused by a high density energy source.

Suitable energy sources for melting the feedstock can be various high energy density technologies including laser, electron beam, plasma arc deposition, and the like. The high energy density in combination with high cooling/solidification rates results in structures with homogeneous microstructures and high structural integrity. The process metallurgically bonds deposited layers, promoting a continuous grain structure and epitaxial growth between layers. The technique produces a gradual accumulation ("growing") of material by repetitive deposition of uniform beads of material that quickly solidify due to efficient heat conduction into the substrate material.

Direct manufacturing techniques of additive fabrication enable design and fabrication of specialized warheads using unique shaping, materials, and structures that have conventionally been difficult or impossible to use. Special warhead shapes may include nose cones, walls of controlled thickness, fragmentation patterns, and the like. Unique and previously unused materials include new material alloys, non-homogeneous materials, deformable materials, variable hardness or density material mixes, and others.

Direct manufacturing techniques expand available capabilities in warhead design and fabrication, enabling shapes and material compositions that have heretofore been unavailable in warhead manufacture. In accordance with some embodiments, a warhead comprises a casing formed of a plurality of additively-deposited, direct-manufactured layers.

According to other embodiments, a warhead comprises an integral casing having regions of controlled and varied structural parameters in additively-deposited, direct-manufactured layers.

In further embodiments, a warhead comprises a casing and a structural feature coupled to the casing. The casing and the structural feature are integrally formed in a plurality of additively-deposited, direct-manufactured layers.

According to other embodiments, a method of fabricating a warhead comprises additively depositing a plurality of direct-manufactured layers of a selected material type, and controlling positioning of the deposition of layers to build a structure of a selected geometry. The method further comprises varying at least one controlled structural parameter during deposition of the additively-deposited, direct-manufactured layers.

In some embodiments and applications, direct manufacturing techniques can be used to "scribe" materials for tailored and optimized fragmentation. In some embodiments, non-homogeneous constructions, based on deposition of varying materials or variable deposition of a single material, can be obtained for specialized performance. In some embodiments, non-homogeneous materials can be combined to affect a time varying (deformable) warhead capability that facilitates steering performance, optimized penetration, and other desired functionality.

Usage of direct manufacturing techniques also enables a faster and more flexible warhead development process, from design through early fabrication phases, increasing innovation and productivity in comparison to conventional methods.

Through the various embodiments, the illustrative direct manufacturing techniques enable and facilitate rapid and innovative warhead design capabilities from conception through design and fabrication. Direct manufacturing techniques applied to warhead design and manufacture enables and facilitates an expanded breadth of useful warhead materials, material combinations, shaping techniques, and construction approaches. The illustrative direct manufacturing techniques enable reduction in touch labor during submunitions and combined effects warhead fabrication and facilitate increased capabilities to tailor warhead performance to application requirements.

BRIEF DESCRIPTION OF THE DRAWINGS

Embodiments of the invention relating to both structure and method of operation, may best be understood by referring to the following description and accompanying drawings.

DETAILED DESCRIPTION OF THE EMBODIMENTS

Figure 1:
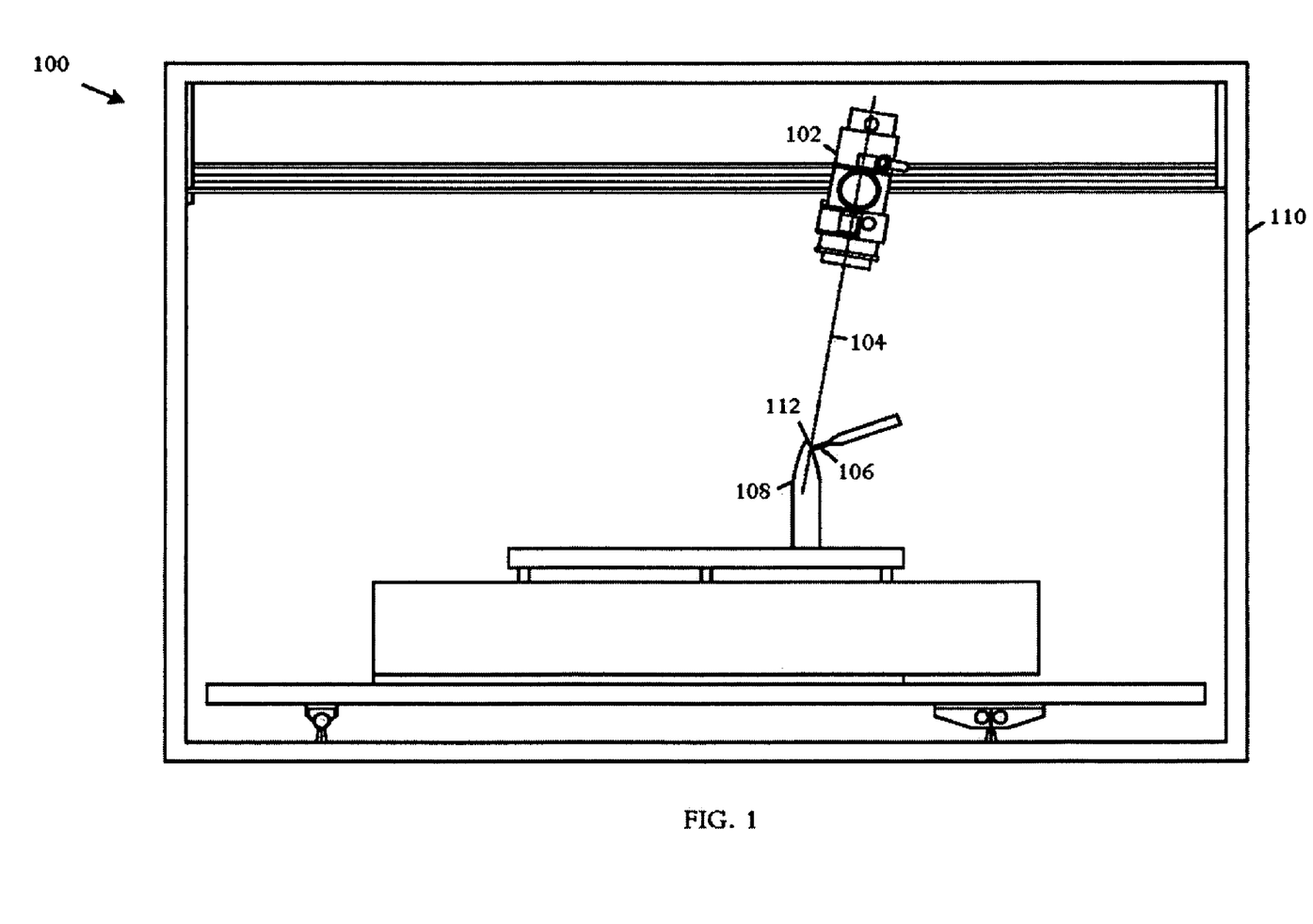
FIG. 1 is a schematic pictorial diagram illustrating an example of a suitable high energy density direct manufacturing device for usage in fabricating warheads and special warhead structures.

Referring to FIG. 1, a schematic pictorial diagram illustrates an example of a suitable high energy density direct manufacturing device 100 for use in fabricating warheads and warhead structures. The illustrative high energy density direct manufacturing device 100 is a precision controlled moving-gun electron beam welding system although other devices can also be used, for example laser beam devices, plasma arc deposition devices, and others. The direct manufacturing process or method is similar to welding using a high energy heat source to create a molten pool on a substrate and adding wire or powder material to the molten pool to create a deposited bead of material. These deposited beads can be combined to create a layer of deposited material, and many layers can be combined to create a large deposited structure.

The direct manufacturing device 100 includes an electron beam gun 102 that produces an energy beam 104, illustratively an electron beam, used to melt the substrate and feedstock 106 and to accumulate deposited material on the substrate 108. The substrate 108 and the electron beam gun 102 are positioned within a chamber 110 with relative movement between the two enabling continuous and proper positioning of the deposition pool. The electron beam gun 102 generates the energy beam 104, focused so that energy density at a point 112 at which the energy beam 104 intersects with the surface of the substrate 108 is sufficient to locally melt the substrate. Electron beam energy transforms into heat at the substrate surface. An electron beam system 100 can commonly include a vacuum chamber 110 to fabricate articles from any electrically conductive substance, typically metals, capable of melting upon application of a high-energy source. In some embodiments using laser or plasma arc energy sources the chamber 110 is filled with an inerting gas for improved deposition performance. In some embodiments alloying elements in gaseous form are introduced into the atmosphere around the molten pool and these become incorporated into the resulting deposited material.

The energy beam 104 moves relative to the substrate surface, resulting in an absorbed energy rate sufficient to melt the substrate 108 to a shallow depth. The energy beam 104 melts additional material from the feedstock 106 and this material accumulates into the molten pool forming a bead on the substrate 108. The electron beam gun 102 and/or the substrate target move under power of motion control robotics, moving the molten pool along the substrate 108, leaving behind a bead of material formed in a continuous path.

Various warhead structures can be designed and fabricated by varying feedstock materials, varying density patterns on the substrate, and programming the controllers of the robotic electron beam gun to form different shapes, including highly complex shapes. Particular heat sources may be more effective or better suited to fabrication using particular feedstock materials. In various applications different energy sources may be appropriate for particular metal substrates.

Figure 2:
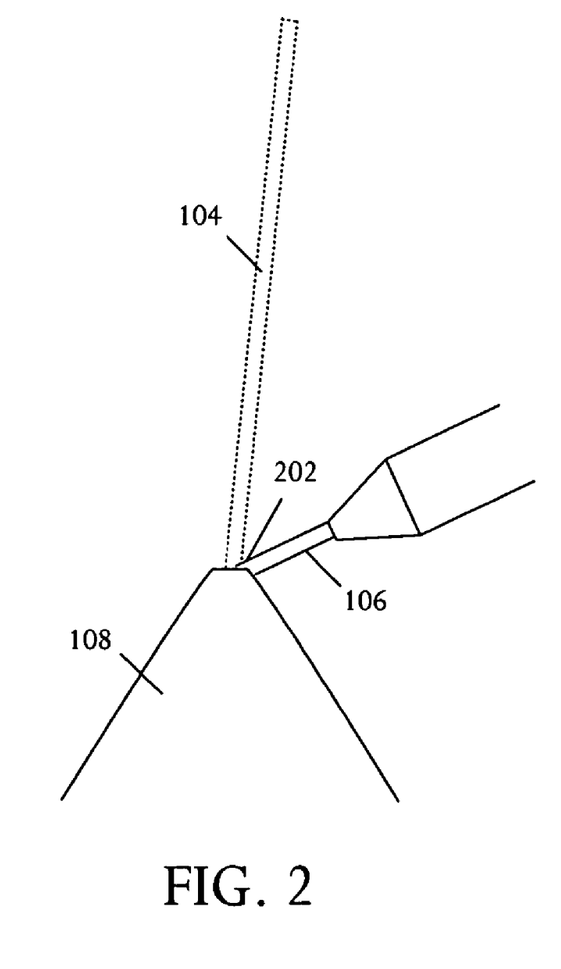
FIG. 2 is a schematic pictorial diagram that illustrates a view of the substrate, feedstock, and high energy density source during deposition of molten material.

Referring to FIG. 2, a schematic pictorial diagram illustrates a view of the substrate 108 during deposition of molten material. The feedstock 106 is introduced to the molten pool at the intersection 112 of the energy beam 104 and the substrate surface 108

In various embodiments, the feedstock 106 can be a wire fed through a feeding apparatus conventional to welding processes. A wide variety of wire feedstock options exist with this approach.

In other embodiments, the feedstock 106 can be in powder form and be supplied through a nozzle. Appropriate conventional powder feedstock delivery devices supply a constant mass flow of powder in a uniform stream or streams. Powder feedstock composition can be varied during operations to enable a continuously changing alloy or non-homogeneous material composition during the deposition process.

Figure 3:
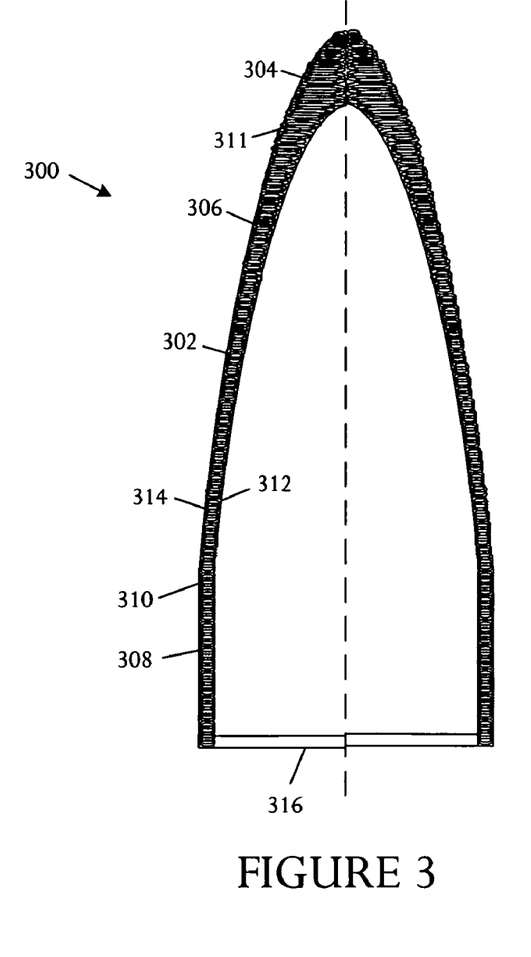
FIG. 3 is a pictorial diagram that shows an example of a casing for a warhead with a deposited variable wall thickness.

Referring to FIG. 3, a pictorial diagram shows an example of a casing 302 for a warhead 300 with varying wall thickness. The warhead 300 has a relatively thick casing portion 304 in the vicinity of the warhead nose cone 306 that changes to a thin casing portion 308 anterior to the nose cone 306 at the cylindrical walls 310. One technique for fabricating the warhead casing 302 comprises accumulation of multiple beads 311 formed in a circular configuration to build the cylindrical walls 310. The nose cone 306 is formed by gradually reducing the radius of the circular configuration at increasing heights and, in some embodiments, increasing wall thickness. Once the fundamental structure of the warhead 300 is complete, including cylindrical walls 310 and nose cone 306, inner walls 312 and/or outer walls 314 of the warhead 300 can be machined to desired surface characteristics. A closeout piece 316 can be constructed separately or integral to the warhead 300 using the disclosed direct manufacturing process or using an alternative construction technique. A separate closeout piece 316 can be fastened to the nose cone 302 by welding using the energy beam 104 as a heat source. In an alternative embodiment, closeout piece 316 is formed by inverting the nose cone 306 and accumulating layers that close the open circle at the warhead base.

Figure 4:
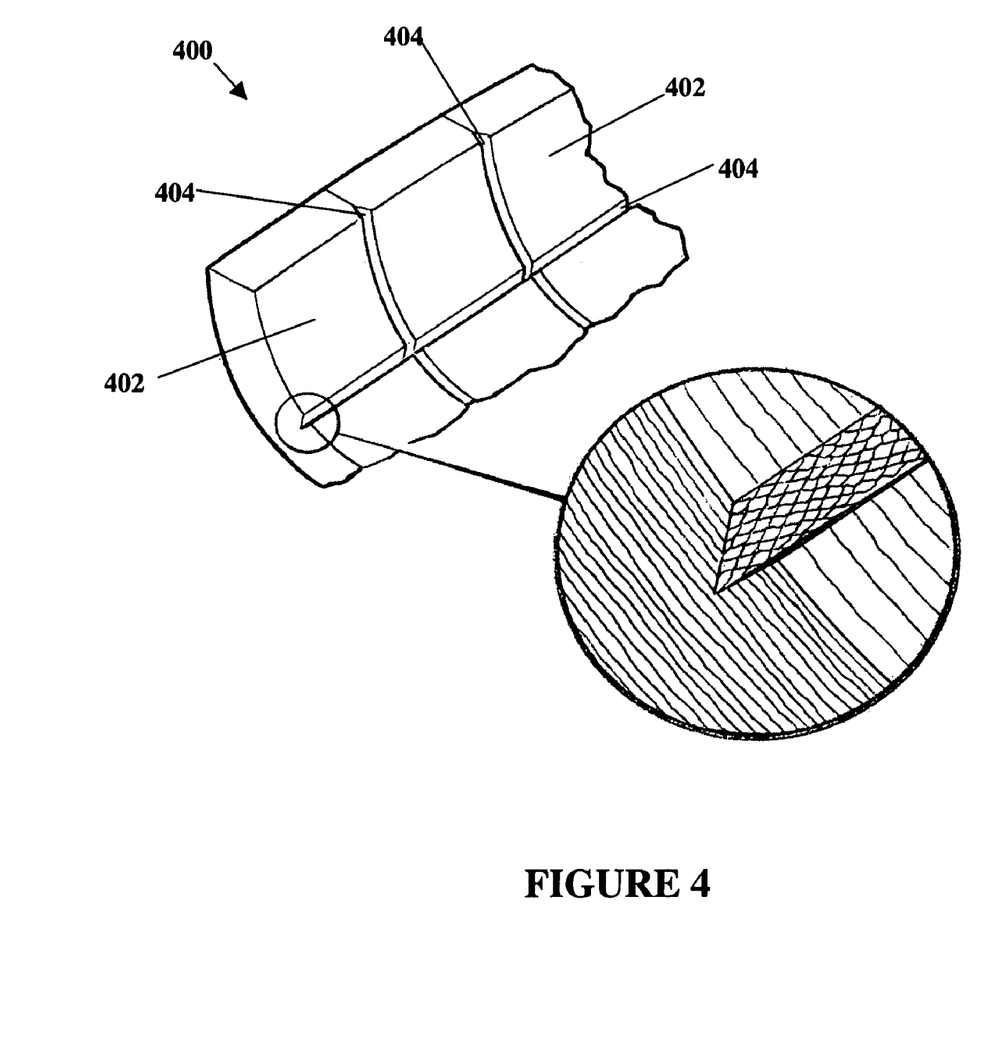
FIG. 4 is a three-dimensional pictorial diagram showing an example of a warhead segment with a fragmentation pattern formed by selective material placement during the deposition process.

Referring to FIG. 4, a three-dimensional pictorial diagram shows an example of a warhead segment 400 with a fragmentation capability. The warhead segment 400 can be formed in an appropriate configuration, such as a cylinder, by direct manufacturing techniques through accumulation of multiple layers in a circular form. The warhead segment 400 is a preformed fragmentable block 402 that can be fabricated into a warhead casing. The fragmentable block 402 is capable of fragmenting consistently in a specified, predictable pattern upon explosion or impact. In some embodiments, the fragmentation pattern is produced by accumulating layers in the direct manufacturing process so that notches 404 are formed in a preselected pattern. The notches 404 form lines of weakness having increased susceptibility to fracture. The notches 404 can be precisely controlled in position and depth, resulting in highly predictable fragmentation effects.

Figure 5:
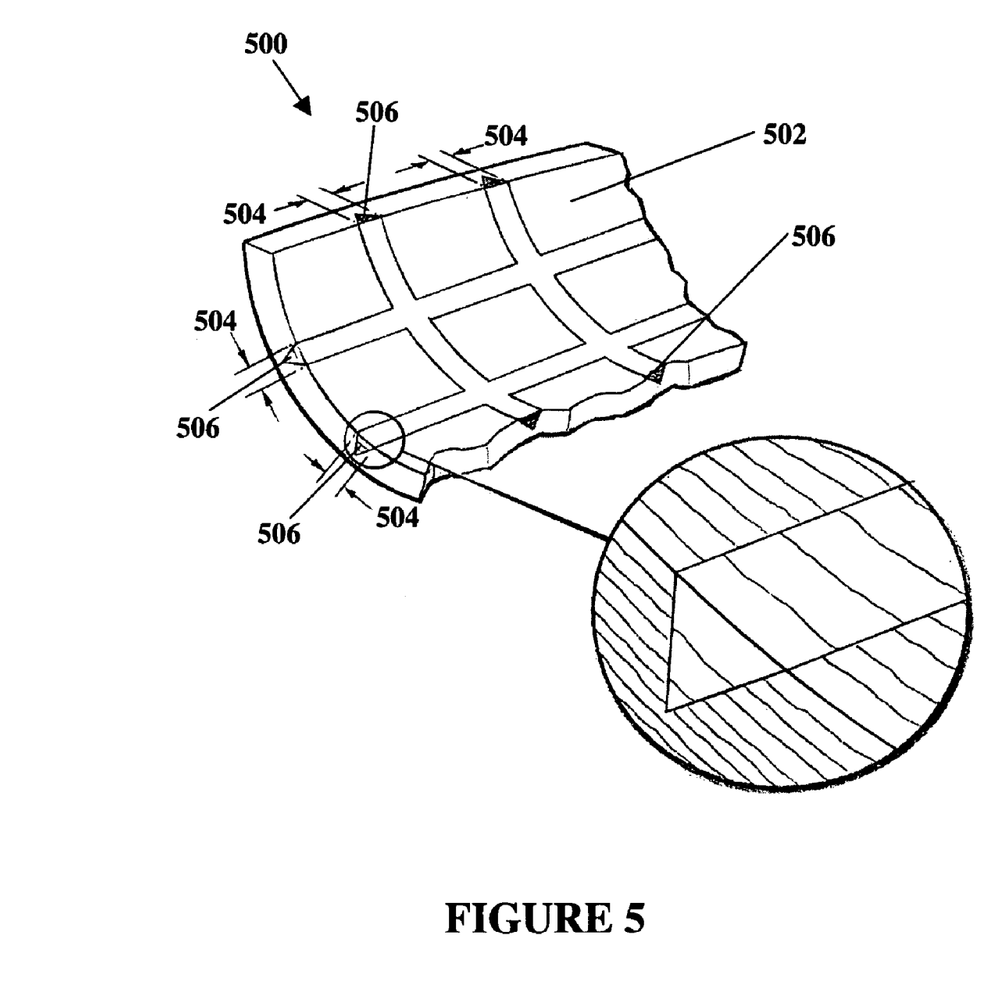
FIG. 5 is a three-dimensional pictorial diagram showing a warhead segment with a fragmentation pattern formed by controlling and varying material density during the deposition process.

Referring to FIG. 5, in other embodiments, fragmentation patterns can be inserted by controlling and varying density of the wall material 500. One technique for producing reduced density areas 504 is to vary deposition temperature, time, or composition of deposited material. Reduced density areas 504 have lower strength, so that the casing 502 has greater susceptibility to fracture along predetermined lines 506. The reduced density areas 504 can be precisely controlled in position, material composition, and hardness, leading to highly predictable fragmentation effects.

Figure 6:
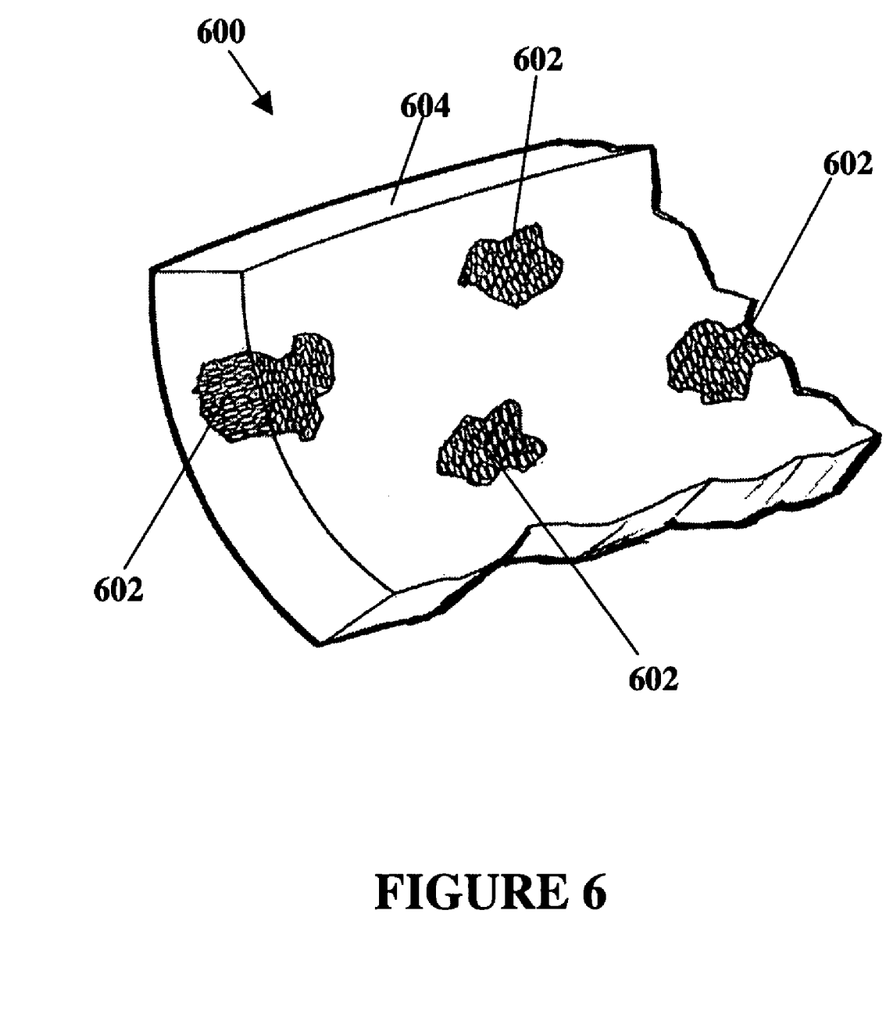
FIG. 6 is a three-dimensional pictorial diagram that illustrates an example of a warhead segment containing internally fabricated special material elements formed by controlling and varying material type during the deposition process.

Referring to FIG. 6, a three-dimensional pictorial diagram illustrates an example of a warhead segment 600 containing internally fabricated special material elements 602. In an illustrative embodiment, the special material elements 602 are zirconium slugs. In Combined Effects Munitions (CEMs) and Combined Effects Bombs (CEBs), the warhead 600 can be a shaped charge with a scored steel casing 604 and special material elements 602 including zirconium slugs, aluminum particles, magnesium particles, tungsten slugs, and other materials to introduce fragmentation, incendiary, and anti-armor capabilities. The warhead segment 600 is fabricated by introducing various selected materials during the deposition process to provide the special material elements and controlling and varying the deposition to create individual fragmentation zones about these elements. For example, zirconium slugs can be positioned on the substrate during layering at selected positions or in selected densities. Special material elements can be positioned on the top layer of substrate during fabrication and combined with the molten material as the energy beam passes over the segment of substrate. Molten feedstock encases the material elements 602 as layers accumulate. The material elements 602 can be combined with various metals including new material alloys.

Figure 7A:
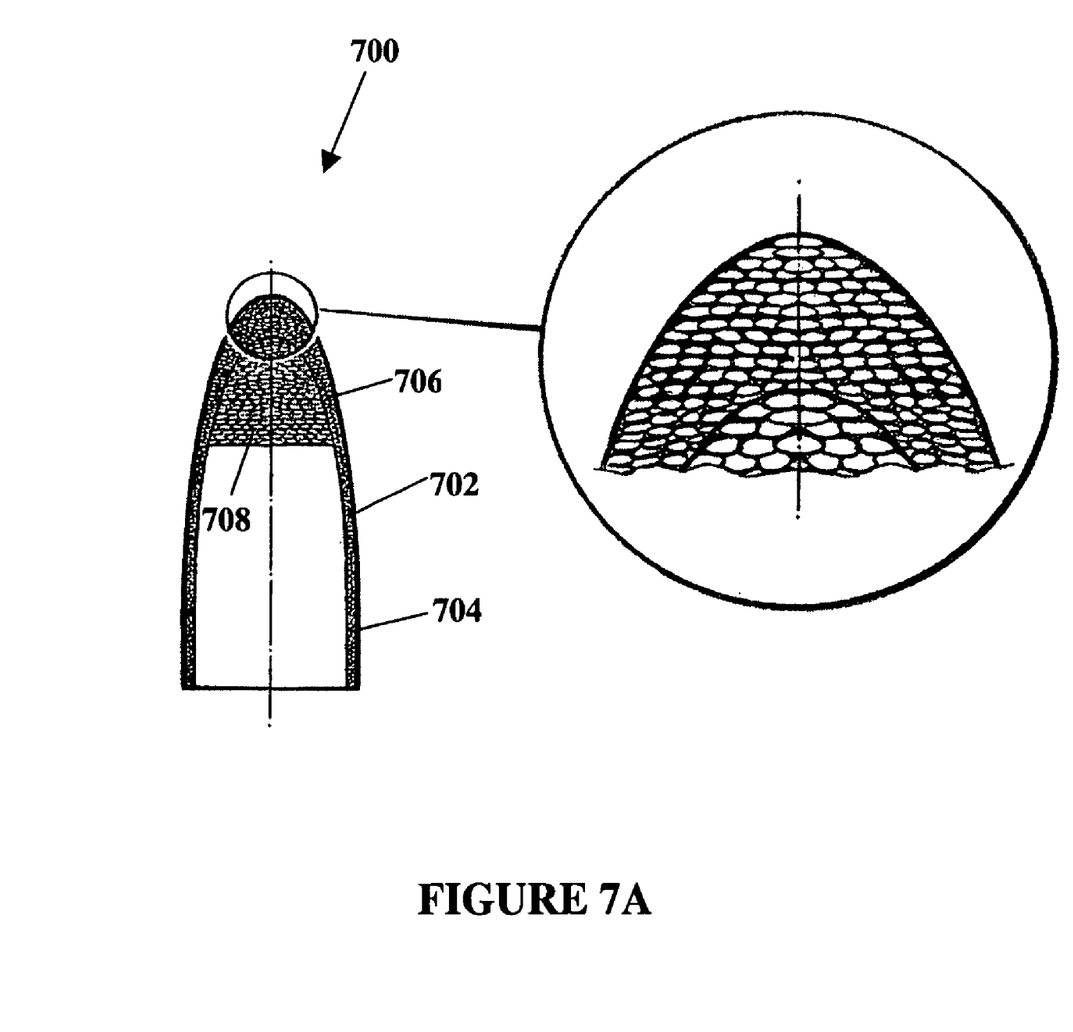
FIGS. 7A and 7B show illustrative warhead segments that include metal casings with internal slugs formed integral to the casing by controlling and varying material type during the deposition process.
Figure 7B:
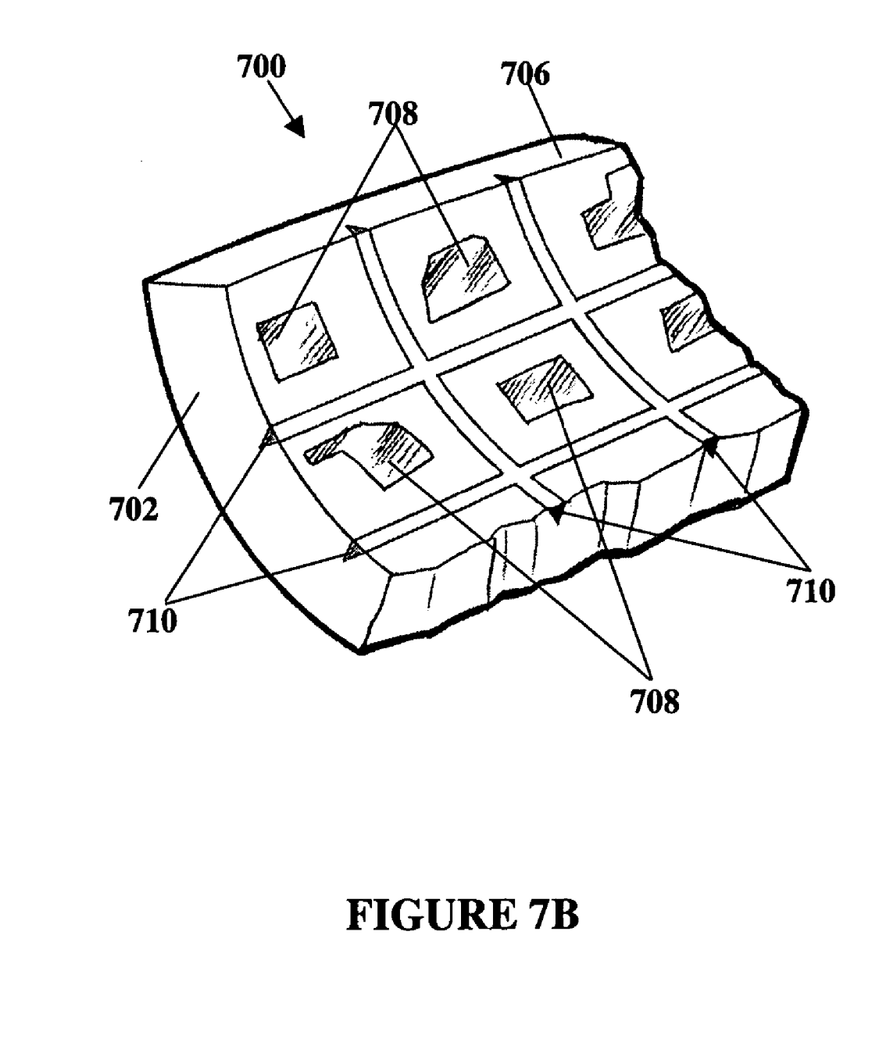

Referring to FIG. 7A and 7B, pictorial diagrams illustrate warhead designs including multiple integrally formed metal components. Referring to FIG. 7A, a warhead segment 700 includes a steel casing 702 with a cylindrical body 704 tapering to a nose cone 706, and a tungsten slug 708 formed integral to the casing 702. Integral layers of steel casing 702 and tungsten slugs 708 are fabricated by exchanging feedstock materials during layering of molten material. FIG. 7B shows a three-dimensional view of the warhead segment 700 including the steel casing 702 and tungsten slugs or pellets 708 integrally formed into the casing (akin to the CEM and CEB embodiments described above). In the illustrative embodiment of the warhead segment 700, the steel casing 702 has reduced density/deposition lines 710 to generate predetermined fragmentation effects. In various embodiments, casing, slug, and other particle materials can be varied to facilitate penetration and to produce variable properties such as strength, ductility, hardness, density, and the like.

Figure 8:
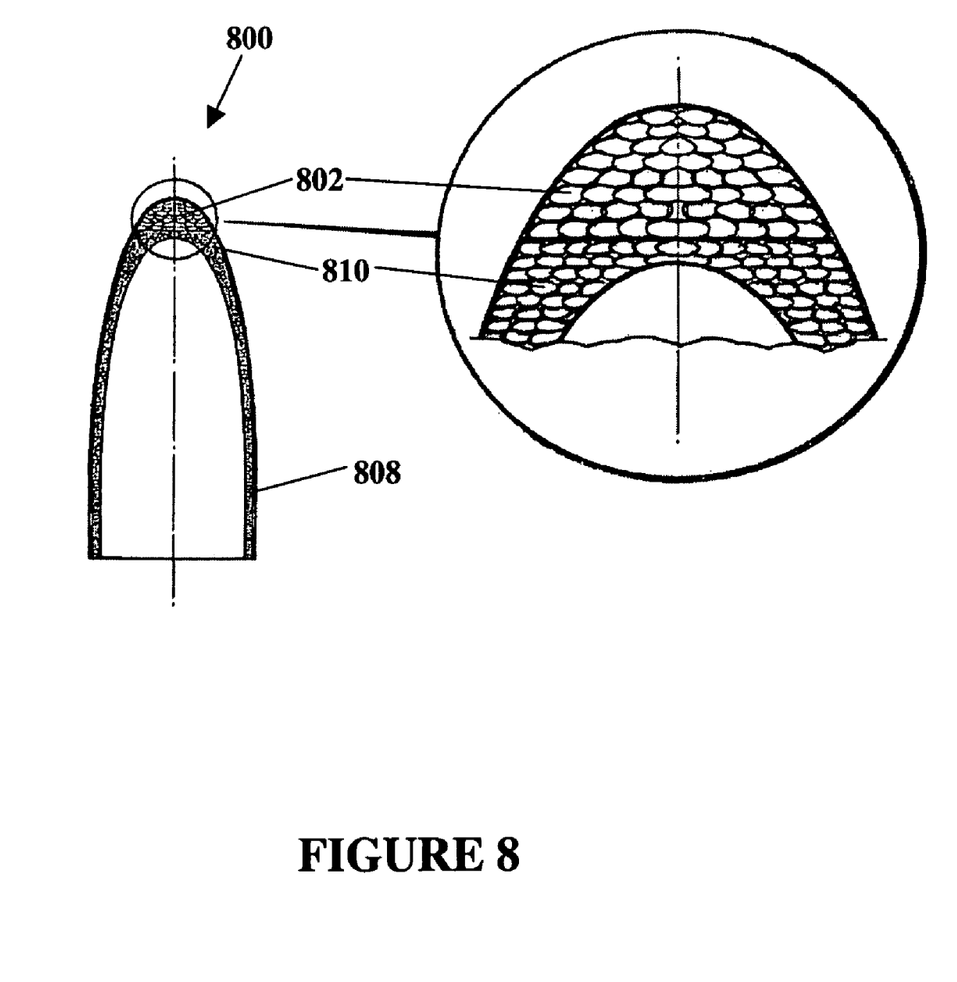
FIG. 8 is a cross-sectional pictorial diagram showing an embodiment of a warhead segment that improves penetration by deposition of a hard and dense material tip on the end of a less hard and dense material body.

Referring to FIG. 8, a cross-sectional pictorial diagram shows an embodiment of a warhead segment 800 that improves penetration by fabricating a higher strength tip 802 on the end of a lighter weight/lower strength tube 808. The high strength tip 802 is layered onto the end cap 810 of a lighter weight/lower strength tube 808 using the direct manufacturing processes. The direct manufacturing approach enables the controlled tapering and wall thickness of the tube 808 to the end cap 810.

Figure 9:
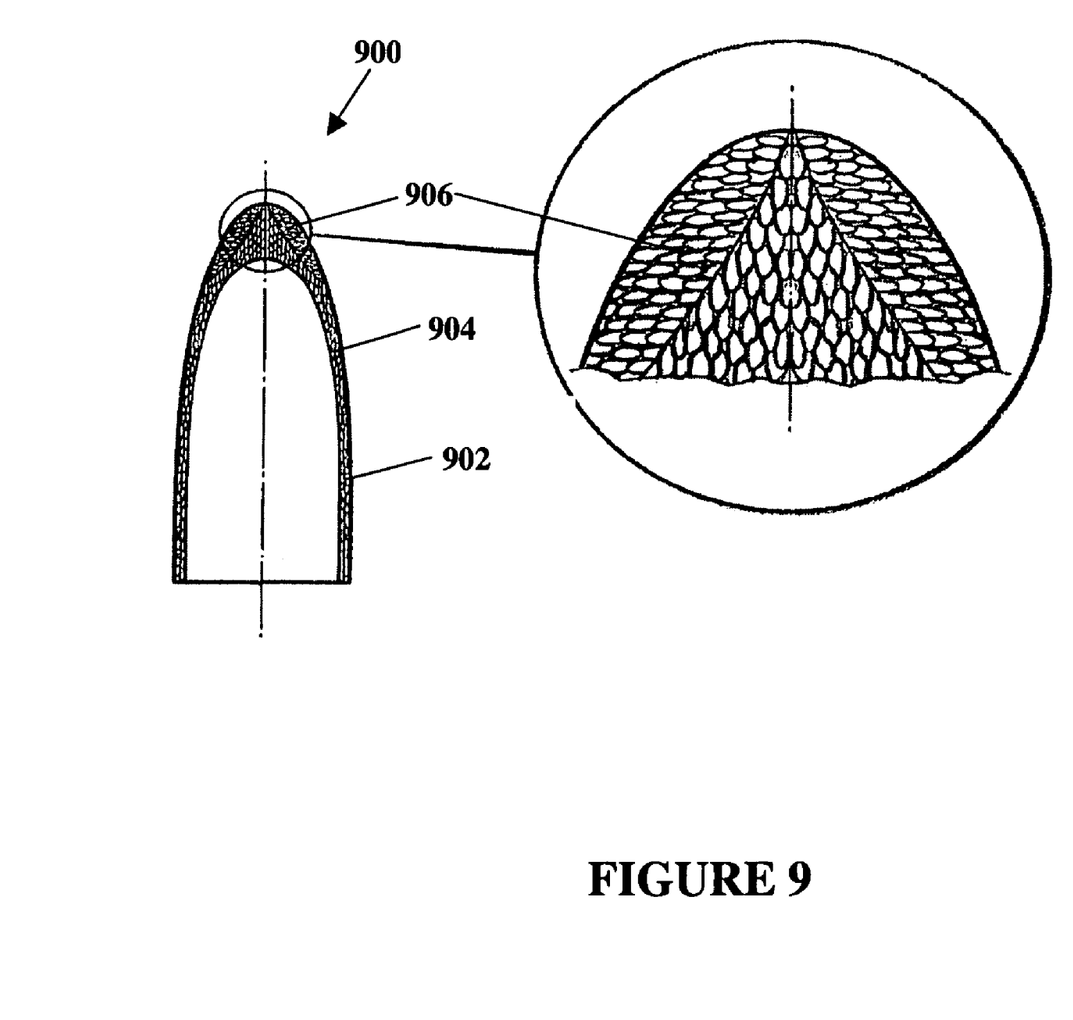
FIG. 9 is a cross-sectional pictorial showing an embodiment of a warhead segment that improves penetration by deposition of a softer material blunt nose cone over a harder material internal penetrator body.

Similarly, referring to FIG. 9, a cross-sectional pictorial diagram shows a warhead nose cone 900 with tailored properties. This embodiment provides for the creation of nose cones that undergo erosion/shape change during penetration. Materials can be selected from among many appropriate materials such as alloys of steel, tungsten, titanium, zirconium, rhenium, aluminum and others, including various similar metal materials that are appropriate for warhead manufacture, and are deposited in a planned arrangement to affect desired variations in nose cone strength and ductility. The nose cone 900 is constructed (conventional or deposition method) as a cylinder 902 that transitions into a shaped tip 904 using a strong and hard material. The nose cone 900 is then filled out using a more ductile, soft material deposition 906 resulting in varying and shaped hardness characteristics for penetration performance enhancements.

Figure 10:
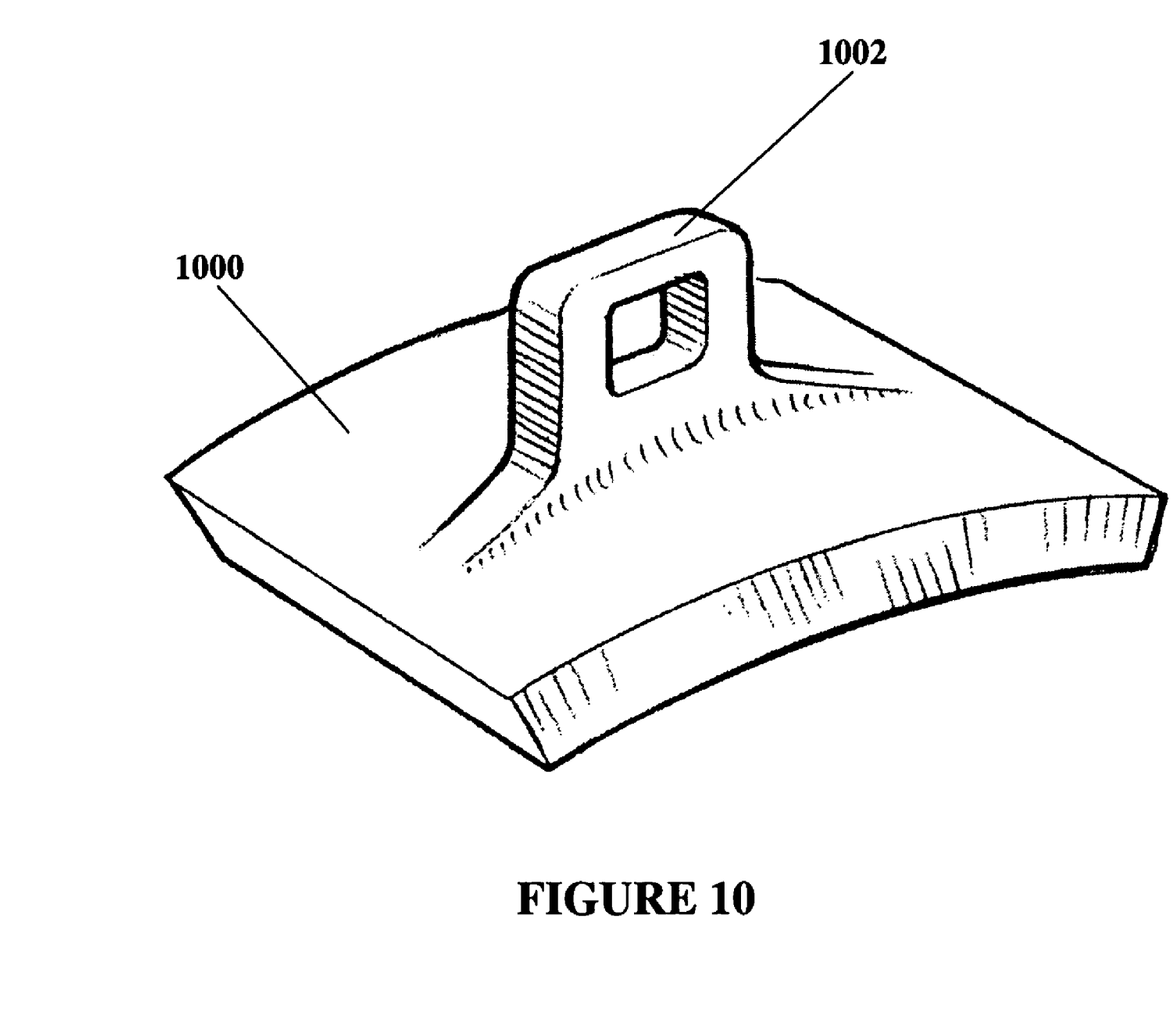
FIG. 10 is a three-dimensional pictorial diagram of an integrally formed structural feature, illustratively a suspension lug, which is formed by controlled deposition directly on the warhead casing.
Figure 11:
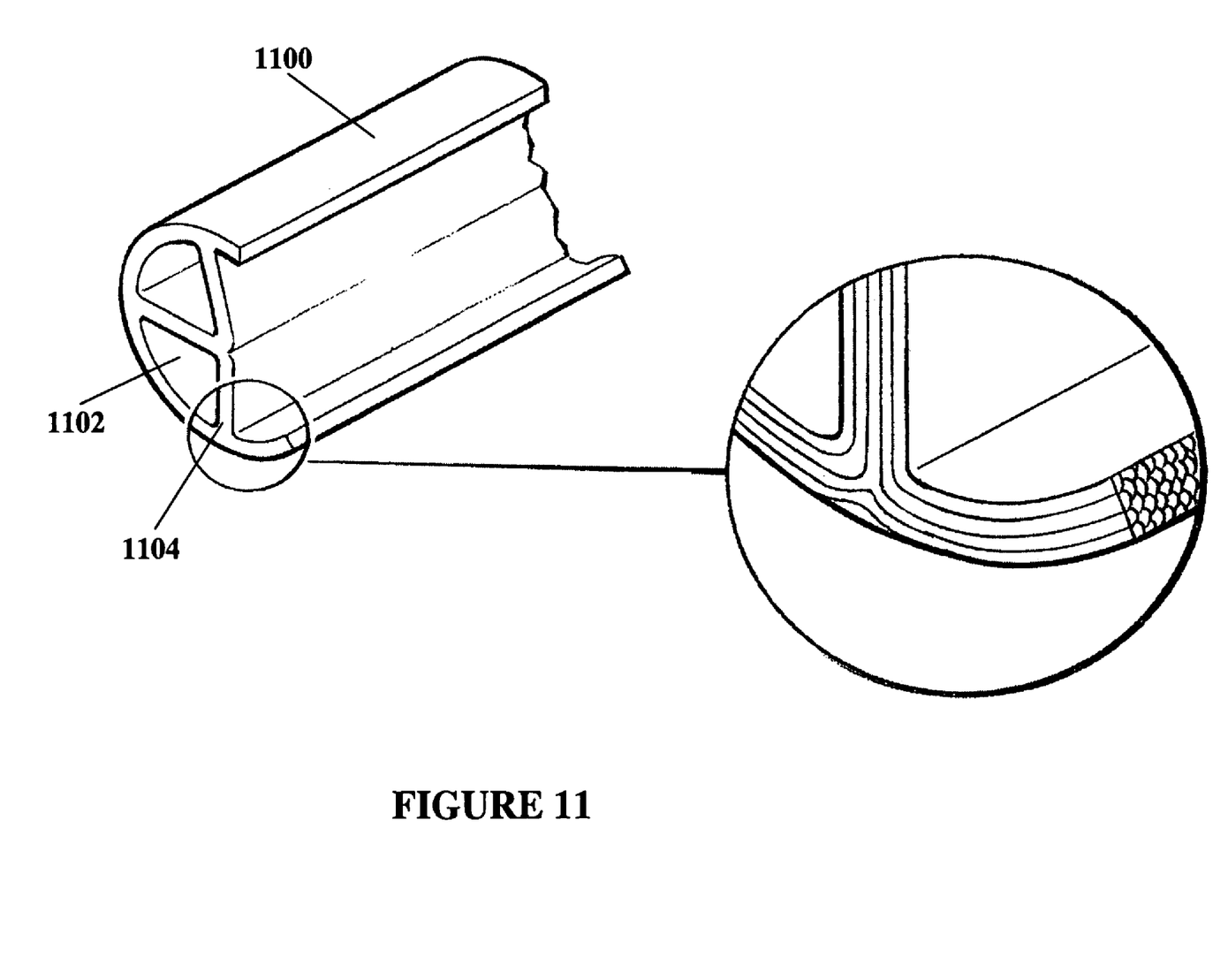
FIG. 11 is a three-dimensional pictorial diagram of a cylindrical-type warhead structure with internal compartments separated by integral walls formed by controlled deposition of material.
Figure 12:
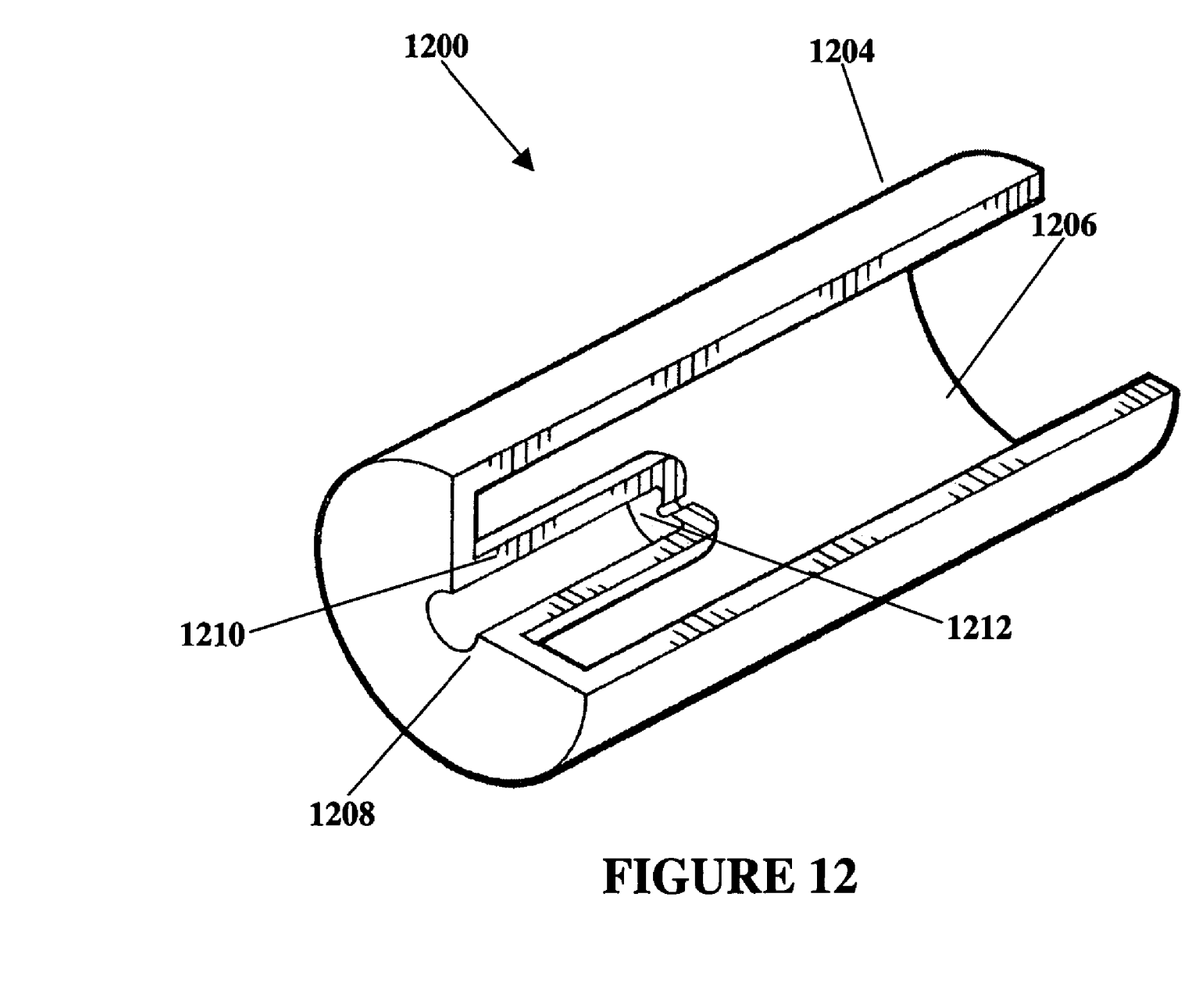
FIG. 12 is a three-dimensional pictorial diagram of a warhead segment including integrally formed closeout and fuze housing formed by controlled deposition of material.

Referring to FIGS. 10, 11, and 12, several three-dimensional pictorial diagrams illustrate examples of integral shapes, structures, and geometries that are enabled using direct manufacturing techniques in warhead manufacture, in lieu of conventional multipart assembly approaches. FIG. 10 depicts an integrally formed suspension lug 1002 that can be formed on a warhead casing 1000. The suspension lug 1002 is formed by building multiple layers of material on a portion of the casing 1000, typically followed by machining the casing 1000 and lug 1002 to form a smooth structure. In another example, a tab can be formed on a casing by layering material and machining.

FIG. 11 shows a cylindrical-type warhead structure 1100 with internal compartments 1102 separated by integral direct manufactured walls 1104 or stiffeners. The compartments 1102 can be filled with special materials such as explosives, or other materials, or left vacant as desired.

FIG. 12 shows a warhead segment 1200 with an integrally formed closeout fuze housing. The fuze housing has a cylindrical casing 1204 enclosing an interior region 1206, and an end piece 1208. A cylindrical vesicle 1210 interior to and axial with the cylindrical casing 1204 extends inward from the end piece 1208 and is capable of holding a fuze. The vesicle 1210 is separated from the interior region 1206 by a wall 1212. In other embodiments, various integrally formed features can include attachment features, electronics attachment features, nose or tail structures, fins, kit attachments, integral nose and/or tail features, and other structures.

Figure 13:
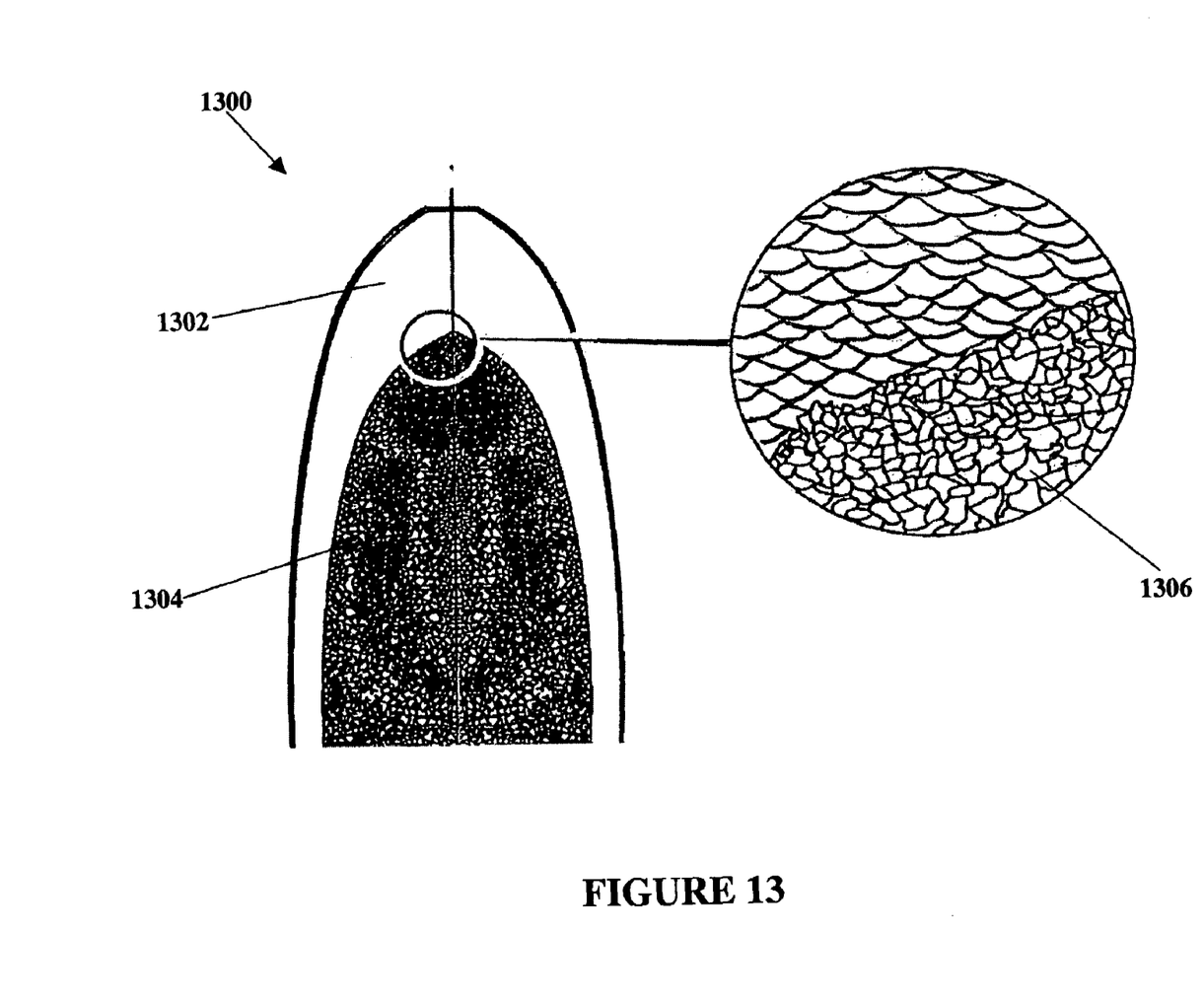
FIG. 13 is a schematic pictorial cross-sectional diagram showing an example of a metallic-foam deposition construction, illustratively a solid metallic outer layer and an internal metallic foam region.

Referring to FIG. 13, a schematic pictorial cross-sectional diagram shows an example of a metallic-foam construction 1300 including a solid metallic outer layer 1302 and an internal metallic foam region 1304. Metallic foam 1304 is useful in application such as lightweight bomb or bomblet devices. The metallic foam 1304 is open-celled and enables the potential for tailored filling of interstitial volumes 1306 with materials such as explosives, or other materials, or may be left vacant to reduce weight. The metallic foam 1304 provides multiple load paths for high strength and stiffness. The metallic foam 1304 forms by incorporating a gas-generating material, for example a titanium hydride powder, into the feedstock. The incorporated foaming agent thermally decomposes in the melt and generated gas converts the melt into porous metal.

While the invention has been described with reference to various embodiments, it will be understood that these embodiments are illustrative and that the scope of the invention is not limited to them. Many variations, modifications, additions combinations, and improvements of the embodiments described are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the invention. Variations and modifications of the embodiments disclosed herein may be made based on the description set forth herein, without departing from the scope and spirit of the invention as set forth in the following claims. For example, although the examples discuss particular deposited materials and combinations of materials, other materials can be formed into the described structures and be used to produce warheads having desired properties.

What is claimed is:

1. A fabrication method comprising:
   fabricating a warhead comprising:
      additively depositing a plurality of direct-manufactured metal layers of a selected metal type;
      controlling positioning of the deposition of metal layers to build a structure of a selected geometry; and
      varying at least one controlled variable structural parameters during deposition of the additively-deposited, direct-manufactured metal layers.

2. The method according to claim 1 further comprising:
   controlling the controlled variable structural parameters selected from among a group comprising variable material composition, variable thickness, variable density, variable material homogeneity, and variable hardness.

3. The method according to claim 1 further comprising:
   incorporating at least one particle of a material non-homogeneous to the additively-deposited material into the plurality of metal layers.

4. The method according to claim 1 further comprising:
   forming the plurality of additively-deposited, direct-manufactured metal layers into a casing.

5. The method according to claim 1 further comprising:
   forming at least one physical discontinuity in the casing, the at least one physical discontinuity facilitating tailored fragmentation of the warhead.

6. The method according to claim 4 further comprising:
   forming at least one region of material discontinuity in the casing, the at least one material discontinuity facilitating tailored fragmentation of the warhead.

7. The method according to claim 4 further comprising:
   incorporating at least one particle of a material non-homogeneous with the casing material within the casing material.

8. The method according to claim 4 further comprising:
   incorporating at least one particle of a material non-homogeneous with the casing material within the casing material, the non-homogeneous material being selected from among a group consisting of zirconium slugs, tungsten slugs, aluminum particles, and magnesium particles.

9. The method according to claim 4 further comprising:
   forming the plurality of additively-deposited, direct-manufactured metal layers into a structural feature; and
   forming the structural feature integral to the casing.

10. The method according to claim 9 further comprising:
    forming the structural feature integral to the casing of a plurality of additively-deposited, direct-manufactured metal layers, the structural feature being selected from a group consisting of suspension lugs, fins, wall stiffeners, fuze/electronics compartments and attachments, internal explosives compartments, and tabs.

11. The method according to claim 4 further comprising:
    forming the plurality of additively-deposited, direct-manufactured metal layers into at least one wall coupled internal to the casing and formed integral to the casing; and
    forming the at least one wall dividing the casing interior into a plurality of compartments.

12. The method according to claim 4 further comprising:
    forming an interior chamber enclosed by the casing; and
    forming a metallic foam within the interior chamber in a plurality of additively-deposited, direct-manufactured metal and gas layers.

13. The method according to claim 1 further comprising:
    applying a focused high-energy beam onto a substrate;
    melting the substrate;
    introducing feedstock into a region encompassing molten substrate and the focused high-energy beam;
    melting the feedstock; and
    combining molten feedstock and molten substrate in the plurality of metal layers.

14. The method according to claim 13 further comprising:
    applying the focused high-energy beam by an energy source selected from among a group comprising laser, electron beam, arc welding, and plasma arc sources.

15. The method according to claim 1 further comprising:
additively depositing the plurality of direct-manufactured metal layers from at least one metal selected from among a group consisting of steel tungsten, zirconium, aluminum, aluminum-lithium, titanium, stainless steel, and rhenium.

16. The method according to claim 1 further comprising:
forming the plurality of additively-deposited, direct-manufactured metal layers into cylindrical walls; and
forming the plurality of additively-deposited, direct-manufactured metal layers into a nose cone, coupling the nose cone to the cylindrical walls and tapering to an end.

17. The method according to claim 1 further comprising:
forming the plurality of additively-deposited, direct-manufactured metal layers into cylindrical casing walls;
forming the plurality of additively-deposited, direct-manufactured metal layers into a nose cone casing extension coupled to the cylindrical casing walls and tapering from the cylindrical casing walls to an end;
forming the nose cone casing extension into walls that increase in thickness toward the end; and
incorporating at least one particle of a material non-homogeneous with the casing material interior to the nose cone casing extension.

18. The method according to claim 1 further comprising:
forming the plurality of additively-deposited, direct-manufactured metal layers into cylindrical casing walls constructed from a first material;
forming the plurality of additively-deposited, direct-manufactured metal layers into a nose cone casing extension coupled to the cylindrical casing walls and tapering from the cylindrical casing walls to an end;
forming the nose cone casing extension with a composition of the first material adjacent to the cylindrical casing walls and a second material, non-homogeneous with the first material, abutting the first material and extending to the end; and forming the nose cone first and second materials in an integral nose cone structure so that upon penetration, variable nose shaping occurs through erosion of variable hardness materials.

19. A fabrication method comprising:
fabricating a warhead comprising:
additively depositing a plurality of direct-manufactured metal layers of a selected metal type;
controlling at least one variable structural parameters during deposition of the additively-deposited, direct-manufactured metal layers; and
forming the metal layers into an integral casing.

20. The method according to claim 19 further comprising:
selecting the controlled variable structural parameters from among a group consisting of variable material composition, variable thickness, variable density, variable material homogeneity, and variable hardness.

21. The method according to claim 19 father comprising:
incorporating at least one particle of a material non-homogeneous with the material forming the casing into the casing material.

22. A fabrication method comprising: fabricating a warhead comprising:
additively depositing a plurality of direct-manufactured metal layers;
forming a casing set of metal layers into a casing;
forming a structural feature set of metal layers into a structural feature; and
integrally combining the casing and structural feature sets of metal layers.

23. The method according to claim 22 further comprising:
selecting the structural feature from a group consisting of suspension lugs, fins, wall stiffeners, fuze/electronics compartments and attachments, internal explosives compartments, and tabs.

* * * * *